UNITED STATES PATENT OFFICE.

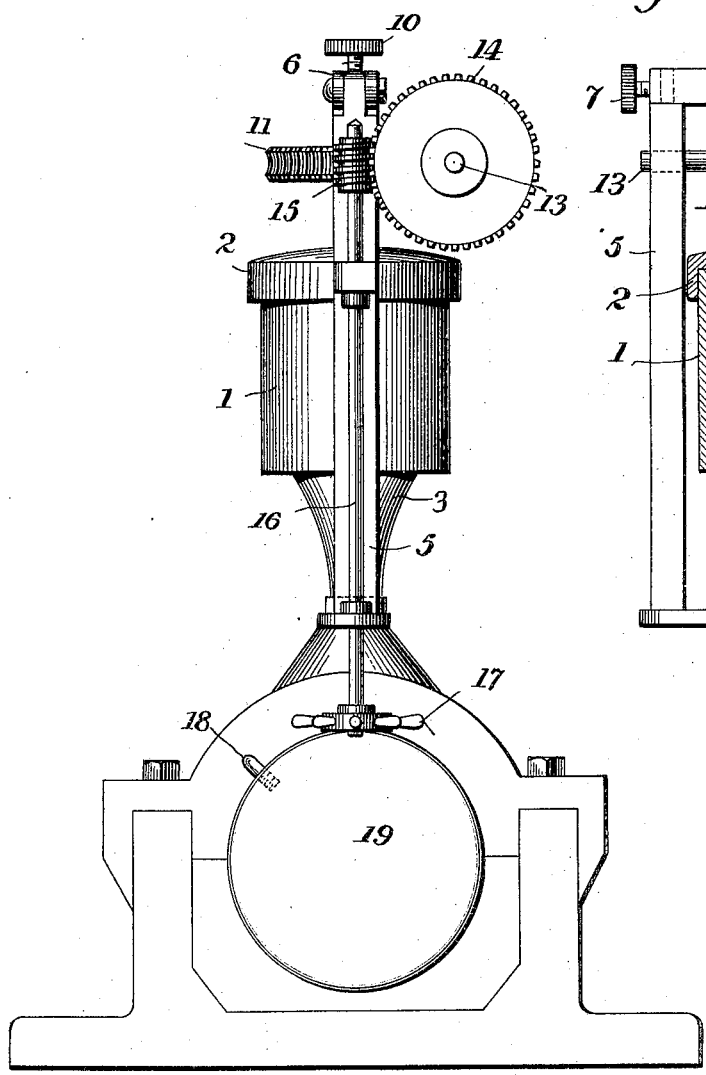
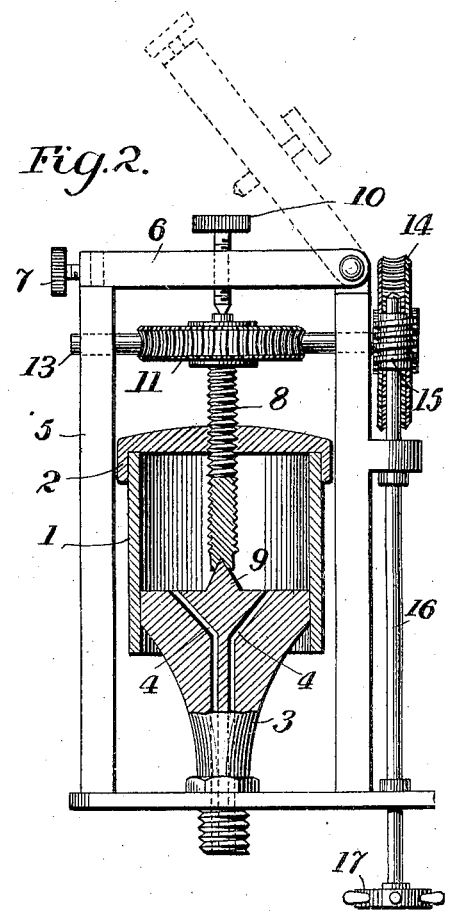
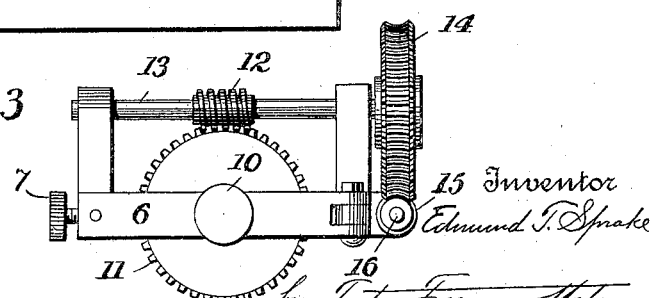

EDMUND T. SPRAKE, OF PLYMOUTH, PENNSYLVANIA.

AUTOMATIC POWER-COMPRESSION GREASE-CUP.

No. 821,966.     Specification of Letters Patent.     Patented May 29, 1906.

Application filed September 22, 1905. Serial No. 279,706.

*To all whom it may concern:*

Be it known that I, EDMUND T. SPRAKE, of Plymouth, in the county of Luzerne and State of Pennsylvania, have invented certain new and useful Improvements in Automatic Power-Compression Grease-Cups, of which the following is a specification.

The present invention relates to improvements in automatic force-feed lubricators and will be described in connection with the accompanying drawings, in which—

Figure 1 is an elevation of a lubricator constructed in accordance with the present invention. Fig. 2 is a side view, partially in section. Fig. 3 is a plan view.

Referring to the drawings, it will be seen that the lubricator comprises a lubricant cup or receptacle 1, having its upper end closed by a cap 2, which is rigidly secured to the side walls of the casing and having its lower end open. A guide 3 is adapted to enter this lower open end of the lubricant-receptacle, said guide being suitably secured on the bearing to be lubricated and provided with any suitable number of conduits or ducts 4, through which lubricant may pass. Said guide and lubricant-receptacle are preferably arranged within a suitable frame 5, having a top plate or bar 6, which is pivotally connected to the frame at one end, whereby it may be swung into the position shown in dotted lines in Fig. 2. When the device is in use, said cross-piece or top plate 6 is secured in the position shown in full lines in Fig. 2 by a suitable set-screw 7.

Means are provided for moving the lubricant-receptacle 1 over its guide 3, and thereby forcing the lubricant into and through the ducts 4 to the surface to be lubricated. As shown, such means include a feed-screw 8, which extends through and engages a suitably-threaded passage in the closed end 2 of the lubricant-cup. The end of said screw within the receptacle 1 has a bearing 9 on the stationary guide 3, and the other end of said feed-screw is engaged by an adjustable thumb-screw 10, mounted in the top bar 6 of the aforesaid frame 5. By this means the feed-screw is held securely against longitudinal movement. On the screw is secured a worm-gear 11, with which meshes a worm 12, mounted on a shaft 13, having its bearings in the frame 5. To said shaft, at one side of the frame 5, is secured a worm-wheel 14, with which meshes a worm 15 on a shaft 16. On this shaft is also secured a sprocket or spur gear 17, the teeth of which project into the path of a pin or stud 18, rotating with the shaft or moving part in connection with which the lubricator is employed.

It will be seen that at each revolution of the shaft 19 in the embodiment of the invention illustrated in the accompanying drawings the stud or pin 18 will turn the gear 17 and parts actuated thereby through a portion of a revolution, and thereby move the lubricant-receptacle 1 over its guide 3 with a step-by-step movement. If it is desired to secure a faster feed of the lubricant than that which would be effected by the arrangement above described, two or more studs 18 may be employed.

An important feature of the present invention is the ease with which the lubricant receptacle or cup 1 may be filled. By loosening the screw 7 the top plate or bar 6 of frame 5 may be turned into the position shown in dotted lines in Fig. 2 and the cup 1 and feed-screw 8 readily lifted from the guide 3.

Having thus described the invention, what is claimed, and desired to be secured by Letters Patent, is—

1. In an apparatus of the character described, the combination with a lubricator comprising a cup or lubricant-receptacle having an opening at one end and a stationary guide extending into said opening in the cup and provided with a duct or passage for conveying lubricant from the cup to the part to be lubricated, of a feed-screw engaging the closed end of the lubricant-cup, and means for automatically rotating said screw to move said cup or lubricant-receptacle over said guide and force lubricant into and through the duct or passage therein.

2. In an apparatus of the character described, the combination with a lubricator comprising a cup or lubricant-receptacle having an opening at one end and a stationary guide extending into said opening in the cup and provided with a duct or passage for conveying lubricant from the cup to the part to be lubricated, of a feed-screw extending through and engaging the closed end of the lubricant-receptacle, one end of said screw bearing against the end of said guide within the lubricant-cup, an adjustable bearing for the other end of said screw whereby said screw and the lubricant-receptacle may be removed from the guide when desired, and a train of gearing adapted to engage said screw when the lubricant-container is in position on said guide, substantially as and for the purpose described.

3. In an apparatus of the character described, the combination with a lubricator comprising a cup or lubricant-receptacle having an opening at one end and a stationary guide extending into said opening in the cup and provided with a duct or passage for conveying lubricant from the cup to the part to be lubricated, of a feed-screw extending through and engaging the closed end of the lubricant-receptacle, one end of said screw bearing against the end of said guide within the lubricant-cup, a gear fixed to said screw outside the lubricant-container, and means for automatically rotating said gear.

In testimony whereof I affix my signature in presence of two witnesses.

EDMUND T. SPRAKE.

Witnesses:
W. L. RAEDER,
CHAS. F. MILLER.